United States Patent Office 3,801,699
Patented Apr. 2, 1974

3,801,699
REDUCING SCALE DEPOSITION FROM ALKALINE EARTH METAL SULFATE AND FULFITE SLURRIES
John L. Arnold, Midland, Mich., assignor to The Dow Chemical Company, Midland, Mich.
No Drawing. Continuation-in-part of application Ser. No. 93,883, Nov. 30, 1970. This application Mar. 17, 1972, Ser. No. 235,801
Int. Cl. C01b 17/00
U.S. Cl. 423—244
6 Claims

ABSTRACT OF THE DISCLOSURE

In the process for transferring an aqueous slurry of calcium sulfate, calcium sulfite, calcium carbonate, dolomite, magnesium sulfate, magnesium sulfite, magnesium carbonate, fly ash or mixture thereof in contact with surface areas to a settling chamber where the solids are separated from the liquid, polyacrylamide is added to the slurry to prevent scale formation on the surfaces. Subsequent separation of the solids from the slurry is not adversely affected.

CROSS-REFERENCE TO RELATED APPLICATION

This application is a continuation-in-part of my earlier application Ser. No. 93,883, filed Nov. 30, 1970, now abandoned.

BACKGROUND OF THE INVENTION

In response to the growing national demand for air pollution abatement, processes have been developed for removing sulfur oxides from stack gas using calcined limestone or dolomite. In one system, pulverized limestone is dry mixed with powdered coal, and the mixture is burned. During combustion, the limestone reacts with most of the sulfur trioxide and about 20–30% of the sulfur dioxide. The gases from the combustion are cooled in an air heater and then washed with a slurry of calcium and/or magnesium hydroxides. In this washing, sulfur trioxide and sulfur dioxide from the stack gas react to form sparingly soluble sulfates and sulfites, respectively. The resultant slurry containing the sulfates and sulfites is transferred in contact with surface areas to a settling pond where the solids are separated and the liquid is recycled. In another system, the gases from the combustion are cooled in an air heater, either with the fly ash present or not, and then washed with a slurry of finely divided limestone or dolomite. In this washing, sulfur trioxide and sulfur dioxide from the stack gas react to form sparingly soluble sulfates and sulfites, respectively. The resultant slurry in this system contains sulfates, sulfites, carbonate and, where it is not first precipitated or otherwise removed, fly ash. This slurry is transferred in contact with surface areas to a settling pond where the solids are similarly separated and the liquid recycled.

Unfortunately, in both systems the insoluble products formed separate from the slurry prematurely and form hard, thick scale deposits on the exposed surface areas during transfer to the settling pond. These undesirable deposits require extensive and frequent cleaning to maintain a desirable flow to the settling pond.

It is the object of the present invention to solve this problem by substantially reducing or eliminating this undesirable scale formation on surface areas during transfer without causing a substantial deleterious effect on the separation of the solids in the settling pond.

Methods of reducing depositions in different contexts from that of the invention have been considered. For example, see Zimmie et al. in U.S. 3,085,916 who removed accumulations from cooling systems, and Booth et al. in U.S. 2,729,557 who prevented salt deposition in the cyanidation of precious metal ores.

SUMMARY OF THE INVENTION

It has now been discovered according to the present invention that the problem of scale formation noted above can be substantially reduced or eliminated without a significant adverse effect on the separation of solids by adding to the aqueous slurry of calcium sulfate, calcium sulfite, limestone, dolomite, magnesium sulfate, magnesium sulfite or mixture thereof a small but effective amount of polyacrylamide.

The important and novel aspect of the invention is the achievement of the beneficial prevention of deposition from the slurry during transfer to the settling pond while retaining desirable separation of the solids from the slurry in the settling pond.

The aqueous slurry formed when the stack gas containing $SO_3$ and $SO_2$ is contacted with the scrubbing solution, i.e., limestone, dolomite, etc., consists of sulfates and sulfites of the hydroxides or carbonates in the solution plus fly ash, in some cases. If, for example, only $SO_2$ is in the stack gas and the solution contains either calcium hydroxide or calcium carbonate, calcium sulfite will be obtained. $SO_3$ reacts to give the sulfate. The slurry treated by the present invention is formed in this reaction. Thus, the composition of the slurry will depend upon the gases reacted and the reactants employed.

The polyacrylamide used in the invention may be anionic, nonionic or cationic polyacrylamide having molecular weight of more than about 500,000, with molecular weights of more than about 1,000,000 being preferred. The polyacrylamide may be hydrolyzed or unhydrolyzed, with those polyacrylamides which are about 2 to about 30% hydrolyzed being especially preferred. Acrylamide polymers meeting these specifications are readily available on a commercial scale.

The polyacrylamide can be added at a number of obvious points in the process. It can be added to the slurry going to the settling pond or it can be added with the fresh reactant prior to washing the gas. Where the stack gases are passed through a contacting tower and contacted therein with calcium carbonate or dolomite, for example, it has been found that it is beneficial to add the polyacrylamide along with the carbonate or dolomite. It appears that the polyacrylamide attaches itself to the carbonate or dolomite particles but still permits the reaction between the sulfur oxides and the outer surfaces of the carbonate or dolomite particles to form the sulfates and sulfites. This polyacrylamide-carbonate, or polyacrylamide-dolomite bond appears to be stronger than the polyacrylamide-sulfate (or polyacrylamide-sulfite bond that would be formed if the polyacrylamide was added after the washing of the gases).

The polyacrylamide is preferably added to the slurry as an aqueous solution although it may be added as an aqueous suspension or as a solid. The preferred solutions contain less than about one weight percent acrylamide.

As noted above, the polyacrylamide is added in a small but effective amount. This amount varies with the type of acrylamide employed and also with the changes in the composition of the slurry. The most effective amount for a particular polyacrylamide can be easily determined by a few experiments on the particular slurry. Usually, the slurry of the invention contains about 0.2 to about 40 p.p.m. of polyacrylamide, with about 0.5 to about 10 p.p.m. being preferred because the least amount possible should be employed in an economical operation.

The other parameters of the invention are essentially factors which are inherent in the known processes. These variables are not critical to the invention for the invention is compatible with the known processes. Some of the desirable conditions for the practice of the invention include temperatures of less than about 220° C. and a pH of greater than about 3.

SPECIFIC EMBODIMENTS

Example 1.—Comparison of settling—$Ca(OH)_2$—$CaSO_3$

In parallel tests, 35 ml. aliquots of a $Ca(OH)_2$—$CaSO_3$ slurry containing various amounts and types of additives of the invention were tested for settling rate and compared to a slurry without additive. The additives were: Separan AP–273—an anionic polyacrylamide having a molecular weight of 3 to 6 million and being about 25% hydrolyzed; Separan MGL—a nonionic polyacrylamide having a molecular weight of 3 to 6 million and being less than 5% hydrolyzed; and Separan CP–7—a cationic polyacrylamide having a molecular weight of about 1 million and being 4–10% hydrolyzed. The amounts of the additive and the effect on settling compared to a sample without additive are noted in Table I. The tests were made by allowing the suspension to stand and measuring the clear liquid above the collected solid.

Example 2.—Adhesion to surface areas—$CaSO_3$—$CaSO_4$

In parallel experiments, 1.5 g. $CaSO_3$, 0.5 g. $CaSO_4$, 35 g. of $H_2O$ and polyacrylamide were charged into a 12 dram glass vial, the contents saturated with $SO_2$, and the pH was adjusted to 6–7. The vial was shaken and then allowed to stand for about one hour during which time the rate of clearing was noted. After standing, the contents of the vial were poured out and the remaining residue was noted. The results of these experiments compared to a control run without polyacrylamide additive are shown in Table II.

TABLE II

Settling and adhesion of solid from $CaSO_3$—$CaSO_4$ slurry

| Additive | Additive concentration, p.p.m. | Rate of settling | Residue upon pouring |
|---|---|---|---|
| None | | Slow | Solid layer of sludge remains. |
| XD 1770 | 0.5 | Fairly rapid | Some sludge remains. |
| MGL | 0.5 | do | Do. |
| AP–273 | 1.0 | Rapid | Drains completely. |
| AP–273 | 3.0 | do | Do. |
| AP–273 | 5.0 | do | Do. |

Example 3.—Comparison of settling— $CaCO_3$—$CaSO_3$—$CaSO_4$—fly ash

In parallel experiments, various slurry compositions were charged into a 12 dram glass vial and saturated with $SO_2$ as in Example 2, above. The amounts of AP–273 and the effect on settling compared to samples without AP–273 are noted in Table III. Steel coupons were added in some cases as indicated.

TABLE III

Settling rates of slurries containing $CaCO_3$ reactant and fly ash in addition to reaction products $CaSO_3$ and $CaSO_4$

| Slurry composition, g. | | | | | | | Settling rate at 5 minutes (in./min.) |
|---|---|---|---|---|---|---|---|
| Water | $CaCO_3$ | $CaSO_3$ | $CaSO_4$ | Fly ash | Metal present | Additive | |
| 30 | 5 | | | | None | None | 0.06 |
| 30 | 5 | | 1.0 | | do | do | 0.16 |
| 30 | 1.0 | 4 | 2.0 | 2.0 | do | do | 0.09 |
| 30 | 1.0 | 4.0 | 2.0 | 2.0 | SAE 1010 mild steel | do | 0.06 |
| 30 | 1.0 | 4 | 2.0 | 2.0 | None | 11 p.p.m. AP–273 added after sat'd w/$SO_2$ | 0.16 |
| 30 | 1.0 | 4 | 2.0 | 2.0 | SAE 1010 mild steel | do | 0.16 |
| 30 | 1.0 | 4.0 | 2.0 | 0.2 | do | Approx. 40 p.p.m. AP–273 added before sat'd w/$SO_2$ | 0.6 |
| 30 | 0.5 | 4.0 | 2.0 | 0.2 | None | None | 0.1 |
| 30 | 0.5 | 4.0 | 2.0 | 0.2 | SAE 1010 mild steel | 5 p.p.m. AP–273 added after sat'd w/$SO_2$ | 0.25 |
| 30 | 0.5 | 4.0 | 2.0 | 0.2 | SAE 1010 mild steel precoated w/0.05% AP–273. | 11 p.p.m. AP–273 added after sat'd w/$SO_2$ | 0.24 |
| 30 | 0.5 | 4.0 | 2.0 | 0.2 | None | do | 0.143 |
| 30 | 0.5 | 4.0 | 2.0 | 0.2 | do | 11 p.p.m. AP–273 added before sat'd w/$SO_2$ | 0.30 |
| 30 | 0.5 | 4.0 | 2.0 | 0.2 | do | 5 p.p.m. AP–273 added after sat'd w/$SO_2$ | 0.15 |
| 30 | 0.5 | 4.5 | | | SAE 1010 mild steel | None | 0.74 |
| 30 | 0.5 | 4.5 | | 1.0 | do | do | 0.09 |

TABLE I

Settling rate of $Ca(OH)_2$—$CaSO_3$ slurries containing polyacrylamide compared to slurries without additive

| Additive | Additive in slurry, p.p.m. | Approximate rate compared to blank at 1 hour |
|---|---|---|
| AP–273 | 0.1 | Same, 40% lower.[1] |
| AP–273 | 1.0 | 40% higher, same.[2] |
| MGL | 0.57 | Slightly lower. |
| MGL | 5.7 | Slightly higher. |
| MGL | 11.4 | 70% higher.[2] |
| XD 1770 | 12 | 110% higher.[2] |

[1] At 2 hours. [2] At 50 minutes.

Example 4.—Adhesion to surface areas and rate of settling—$CaCO_3$—$CaSO_3$—$CaSO_4$—fly ash In parallel experiments, various slurry compositions were tested as in the examples above to determine the adhesion to surface areas and the settling rates, with and without the addition of the polyacrylamide AP–273. As indicated in Table IV, below, all compositions were saturated with $SO_2$.

TABLE IV

Effect of CaCO₃ on the settling rate and cohesiveness of solids cake from CaSO₃—CaSO₄—CaCO₃ slurry with and without fly ash

| Slurry composition | Additive | Additive concentration, p.p.m. | Metal present | Rate of settling | Residue upon pouring |
|---|---|---|---|---|---|
| 0.5 g. CaCO₃, 4.5 g. CaSO₄, 1.0 g. CaSO₃, 30 g. H₂O | Saturated w/SO₂ | None | SAE 1010 mild steel | Very slow | 80% removal in three rinses, six rinses were need to flush completely. |
| 0.5 g. CaCO₃, 1.0 g. CaSO₃, 30 g. H₂O | do | | None | Slow | After three rinses, ⅔ of the settled cake remains. Seven rinses were required to flush completely. |
| 5 g. CaCO₃, 30 g. H₂O | do | | do | Extremely slow | Soft cake, easily resuspended. |
| 0.5 g. CaCO₃, 4.5 g. CaSO₄, 30 g. H₂O | do | | SAE 1010 mild steel | Very slow | 80% removal in three rinses, seven rinses were needed for complete flush. |
| 4 g. CaSO₃, 2 g. CaSO₄, 1.0 g. CaCO₃, 2.0 g. fly ash, 30 g. H₂O | do | | None | Slow | Cake clears in 2 rinses to 80–90% complete flush in 3 rinses. |
| Same as above | do | | do | Very slow | 65% removed in 3 rinses, 9 rinses required for complete flush. |
| Do | do | AP-273 added after saturated w/SO₂ | 11.0 | do | Fast | Cake clears 80–90% in 2 rinses—3 rinses required for complete flush. |
| Do | do | | 11.0 | SAE 1010 mild steel | do | 65% removed in 3 rinses—7 rinses were required for complete flush. |
| 4 g. CaSO₃, 2 g. CaSO₄, 0.5 g. CaCO₃, 0.2 g. fly ash, 30 g. H₂O | do | | None | Very slow | 70% resuspended in 2 rinses—5 rinses required for complete flush. |
| Same as above | AP-273 added after saturated w/SO₂ | | do | Fast | Soft cake, easily flushed from vessel in 2 rinses. |
| Do | do | 5 | do | do | Fairly dense cake, 90% resuspended after 3 rinses—complete flush required 4 rinses. |
| Do | AP-273 added before saturated w/SO₂ | 11 | do | Very fast | Loose cake, completely resuspended in 3 rinses. |
| Do | AP-273 added after saturated w/SO₂ | 11 | SAE 1010 mild steel | Fast | Settled cake soft and mobile, flushes completely in 2 rinses. |
| Do | do | 5 | do | do | Settled cake fairly soft—flushes completely in 5 rinses. |
| Do | AP-273 added before saturated w/SO₂ | 11 | do | Very fast | Loose cake completely resuspended after 3 shakes. |
| Do | do | ¹ 40 | SAE 1010 mild steel precoated with 0.05% AP-273 | Extremely fast | Very soft cake, flushed completely in 2 rinses. |
| Do | do | ² 11 | do | Very fast | Soft cake, flushed completely in 4 rinses. |

¹ Approximately.
² Plus what was on metal coupons.

In the same manner as described by the examples above, slurries of calcium sulfate, calcium sulfite, calcium carbonate, dolomite, magnesium sulfate, magnesium sulfite or mixtures thereof are treated with 0.2 to 40 p.p.m. of acrylamide to prevent scale formation on surface areas. Also in the same manner, solid is settled from the acrylamide-containing slurry without a substantial adverse effect on the time required for such separation as compared to the settling of the slurry without acrylamide.

I claim:

1. A process for transferring an aqueous slurry to a settling chamber and settling solids therefrom comprising washing sulfur oxides or sulfur oxides and fly ash from stack gases with a slurry of calcium hydroxide, a slurry of calcium carbonate, a slurry of dolomite, a slurry of a mixture of calcium hydroxide and magnesium hydroxide or a slurry of a mixture thereof, adding from about 0.2 to about 40 p.p.m. of polyacrylamide having a molecular weight of more than about 500,000, and then transferring the resulting slurry in contact with surface areas to a settling chamber and separating solids from the slurry therein, the polyacrylamide addition being in an amount effective to prevent scale formation on the surface areas without a significant deleterious effect upon the separation of the solids from the slurry in the settling chamber.

2. The process of claim 1 wherein the polyacrylamide is added during the washing of the sulfur oxides.

3. The process of claim 2 wherein the sulfur oxides are washed with a slurry of calcium carbonate or a slurry of dolomite.

4. The process of claim 1 wherein the polyacrylamide has a molecular weight of more than about 1 million.

5. The process of claim 1 wherein the polyacrylamide employed is about 2 to about 30% hydrolyzed.

6. The process of claim 1 wherein the slurry contains about 0.5 to about 10 p.p.m. of polyacrylamide.

References Cited

UNITED STATES PATENTS

| 1,405,783 | 2/1922 | Holle | 210—58 |
| 3,518,204 | 6/1970 | Hansen et al. | 210—58 X |
| 3,419,502 | 12/1968 | Newman | 252—180 |
| 2,154,996 | 4/1939 | Rawling | 423—265 |
| 3,085,916 | 4/1963 | Zimmie et al. | 210—58 X |

FOREIGN PATENTS

| 718,387 | 9/1965 | Canada | 210—58 |

EDWARD J. MEROS, Primary Examiner

G. A. HELLER, Assistant Examiner

U.S. Cl. X.R.

210—58; 252—82, 180